(12) United States Patent
Cho et al.

(10) Patent No.: US 8,447,001 B2
(45) Date of Patent: May 21, 2013

(54) APPARATUS FOR PERFORMING CHANNEL ESTIMATION IN A RECEIVING DEVICE

(75) Inventors: Chun-Ming Cho, Hsinchu (TW); Hou-Wei Lin, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 924 days.

(21) Appl. No.: 12/556,424

(22) Filed: Sep. 9, 2009

(65) Prior Publication Data

US 2010/0061495 A1 Mar. 11, 2010

(30) Foreign Application Priority Data

Sep. 11, 2008 (TW) .............................. 97134875 A

(51) Int. Cl.
*H04B 1/10* (2006.01)
*H03H 7/30* (2006.01)
(52) U.S. Cl.
USPC .......................................... 375/350; 375/233
(58) Field of Classification Search
USPC ................. 375/350, 346, 233, 316, 232, 230, 375/229
See application file for complete search history.

(56) References Cited

U.S. PATENT DOCUMENTS

| 6,043,810 A * | 3/2000 | Kim et al. ..................... 345/173 |
| 2007/0013449 A1* | 1/2007 | Ishii et al. ....................... 331/16 |
| 2007/0153731 A1* | 7/2007 | Fine ............................. 370/329 |
| 2009/0022252 A1* | 1/2009 | Goh et al. ..................... 375/344 |

FOREIGN PATENT DOCUMENTS

WO WO 2007134406 A1 * 11/2007

* cited by examiner

*Primary Examiner* — Daniel Washburn
*Assistant Examiner* — Brian J Stevens
(74) *Attorney, Agent, or Firm* — McClure, Qualey & Rodack, LLP

(57) ABSTRACT

An apparatus for performing channel estimation includes a time-domain estimating circuit to perform a channel estimation on a time-domain received signal to output a time-domain estimated signal, a second frequency-domain converting circuit to convert the time-domain estimated signal into a frequency-domain estimated signal, an error computing circuit to produce an error signal based on the frequency-domain estimated signal and a frequency-domain received signal, and a compensation circuit to compensate the frequency-domain estimated signal using the error signal so as to produce a final channel estimation signal. The apparatus is located in a receiving device that includes a first frequency-domain converting circuit to convert the time-domain received signal into the frequency-domain received signal, and an equalizer to generate a frequency-domain recovered signal based on the frequency-domain received signal and the final channel estimation signal.

14 Claims, 9 Drawing Sheets

APPARATUS FOR PERFORMING CHANNEL ESTIMATION IN A RECEIVING DEVICE

CROSS-REFERENCE TO RELATED APPLICATION

This application claims priority of Taiwanese Application No. 097134875, filed on Sep. 11, 2008, the subject matter of which is incorporated herein by reference.

BACKGROUND OF THE INVENTION

1. Field of the Invention

The invention relates to a communication system, more particularly to an apparatus for performing channel estimation in a receiving device.

2. Description of the Related Art

In order to receive signals from a transmitting end correctly, estimation for a transmission channel is usually performed at a receiving end to compensate amplitude and phase of the received signal caused by the channel so as to correctly receive data. A conventional estimating method is to utilize a decision-feedback technique to determine a decision signal of recovered data, and to obtain channel characteristics by training. However, during the training process, decision errors produced by the decision-feedback, technique will accumulate, so that the result of channel estimation is not correct.

Another conventional estimating method is to insert a pilot signal into a signal at the transmitting end and then estimate characteristics of a channel at the receiving end based on the extent the pilot signal are affected by the channel. For instance, in some single-carrier communication systems, the pilot signal is inserted before the data to be transmitted in the time domain. In some multi-carrier communication systems, the pilot signal is distributed among the data to be transmitted in the frequency domain, e.g., a digital video broadcasting-terrestrial (DVB-T).

However, pilot signals have a profound effect on the accuracy of channel estimation, and the smaller the number of pilot signals, the poorer will be the estimation accuracy. For example, the pseudo noise (PN) sequence is used as pilot signal. Because the number of taps of the PN sequence is insufficient, auto-correlation functions cannot completely simulate the ideal delta function, so that errors are generated in the estimated channel impulse response (i.e., time-domain characteristics of the channel).

For prior art relevant to channel estimation, reference can be made to U.S. Pat. No. 7,548,594 and U.S. Pub. No. 20060039488, and to U.S. Pat. No. 6,654,429.

SUMMARY OF THE INVENTION

Therefore, an object of the present invention is to provide an apparatus for performing channel estimation in a receiving device so as to overcome the drawbacks of the aforementioned prior art.

Accordingly, an embodiment of the apparatus of this invention is for performing channel estimation on a time-domain received signal through a channel, and a frequency-domain received signal corresponding to the time-domain received signal. The apparatus comprises: a time-domain estimating circuit to perform a channel estimation on the time-domain received signal in the time domain to output a time-domain estimated signal representing an estimation of characteristic of the channel; a second frequency-domain converting circuit to convert the time-domain estimated signal into a frequency-domain estimated signal; an error computing circuit to produce an error signal based on the frequency-domain estimated signal and the frequency-domain received signal; and a compensation circuit to compensate the frequency-domain estimated signal in the frequency domain using the error signal so as to produce a final channel estimation signal representative of the characteristic of the channel.

Another embodiment of the apparatus of this invention is for performing channel estimation on a time-domain received signal through a channel, and a frequency-domain received signal corresponding to the time-domain received signal. The apparatus comprises: a time-domain estimating circuit to perform a channel estimation on the time-domain received signal in the time domain to output a time-domain estimated signal representing an estimation of characteristic of the channel; a second frequency-domain converting circuit to convert the time-domain estimated signal into a frequency-domain estimated signal; an error computing circuit to produce a frequency-domain error signal based on the frequency-domain estimated signal and the frequency-domain received signal; a third time-domain converting circuit to convert the frequency-domain error signal into a time-domain error signal; a compensation circuit to compensate the time-domain estimated signal in the time domain using the time-domain error signal so as to produce a time-domain channel estimation signal representative of the characteristic of the channel; and a sixth frequency-domain converting circuit to convert the time-domain channel estimation signal to a final channel estimation signal.

Still another embodiment of the apparatus of this invention is for performing channel estimation on a frequency-domain received signal over a channel. The apparatus comprises: a frequency-domain estimating circuit to perform a channel estimation on the frequency-domain received signal in the frequency domain to output a frequency-domain estimated signal representing an estimation of characteristic of the channel; an error computing circuit to produce a frequency-domain error signal based on the frequency-domain estimated signal and the frequency-domain received signal; and a compensation circuit to compensate the frequency-domain estimated signal using the frequency-domain error signal so as to produce a final channel estimation signal representative the characteristic of the channel.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
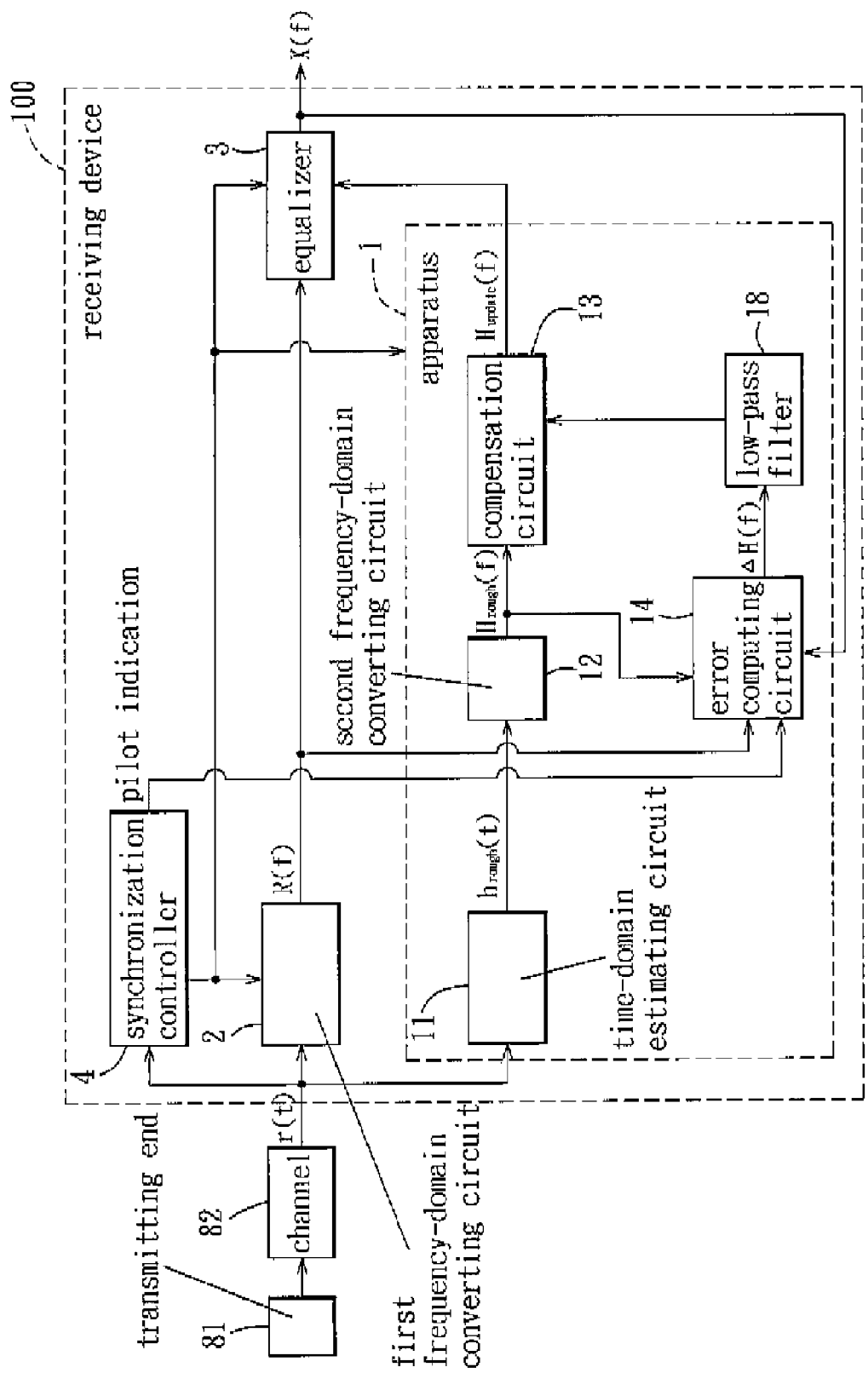
FIG. 1 is a block diagram illustrating the first preferred embodiment of a receiving device according to the present invention.

Before the present invention is described in greater detail, it should be noted that like elements are denoted by the same reference numerals throughout the disclosure.

Referring to FIG. 1, the first preferred embodiment of a receiving device 100 according to the present invention is adapted for processing a time-domain received signal r(t) from a transmitting end 81 over a channel 82. The time-domain received signal r(t) carries data to be transmitted and a time-domain pilot signal p(t) inserted at the transmitting end 81, and the transmitting end 81 delivers the time-domain received signal r(t) after insertion of the time-domain pilot signal p(t) in the time domain. The receiving device 100 according to this embodiment includes an apparatus 1 for performing channel estimation, a first frequency-domain converting circuit 2, and an equalizer 3. Since the equalizer 3 performs processing in the frequency domain, the apparatus 1 will estimate a frequency-domain channel estimation signal $H_{update}(f)$ that represents characteristics of the channel 82, and the first frequency-domain converting circuit 2 converts the time-domain received signal r(t) into a frequency-domain received signal R(f). The equalizer 3 generates a frequency-domain recovered signal X(f) corresponding to the time-domain received signal r(t) based on the frequency-domain channel estimation signal $H_{update}(f)$ and the frequency-domain received signal R(f). The first frequency-domain converting circuit 2 performs the conversion according to the time-domain received signal r(t), and the apparatus 1 performs the estimation specifically based on the time-domain received signal r(t) so as to effectively identify the time-domain pilot signal p(t). In addition, the receiving device 100 further comprises a synchronization controller 4, which provides a synchronization reference to all components of the receiving device 100 based on the time-domain received signal r(t), and which outputs a pilot indication to indicate a position of the time-domain pilot signal p(t).

The apparatus 1 includes a time-domain estimating circuit 11, a second frequency-domain converting circuit 12, a compensation circuit 13, and an error computing circuit 14. The time-domain estimating circuit 11 performs a channel estimation on the time-domain received signal r(t) in the time domain so as to output a time-domain estimated signal $h_{rough}(t)$ representing a rough estimation of the characteristics of the channel 82. One example of the time-domain estimating circuit 11 is a conventional channel estimator, such as a decision-directed time-domain channel estimator or a pilot-symbol-aided time-domain channel estimator. Since such conventional channel estimators are well known to those skilled in the art, a detailed description thereof is not provided herein for the sake of brevity. Since the error computing circuit 14 and the compensation circuit 13 of this embodiment perform processing in the frequency domain, the second frequency-domain converting circuit 12 first converts the time-domain estimated signal $h_{rough}(t)$ into a frequency-domain estimated signal $H_{rough}(f)$, and the error computing circuit 14 then produces a frequency-domain error signal $\Delta H(f)$ based on the frequency-domain estimated signal $H_{rough}(f)$ and the frequency-domain received signal R(f). The compensation circuit 13 subsequently compensates the frequency-domain estimated signal $\Delta H_{rough}(f)$ using the frequency-domain error signal $\Delta H(f)$ so as to produce the frequency-domain channel estimation signal $H_{update}(f)$.

It should be noted that, over time, the time-domain received signal r(t) has a plurality of symbols in sequence, the frequency-domain estimated signal $H_{rough}(f)$ has a plurality of data segments corresponding respectively to the symbols in sequence, and the error computing circuit 14 will produce the corresponding frequency-domain error signals $\Delta H(f)$. The frequency-domain error signal $\Delta H(f)$ computed on the basis of one of the symbols may be used to compensate the data segment corresponding to said one of the symbols or to compensate the data segment corresponding to the symbol that follows said one of the symbols.

Figure 2:
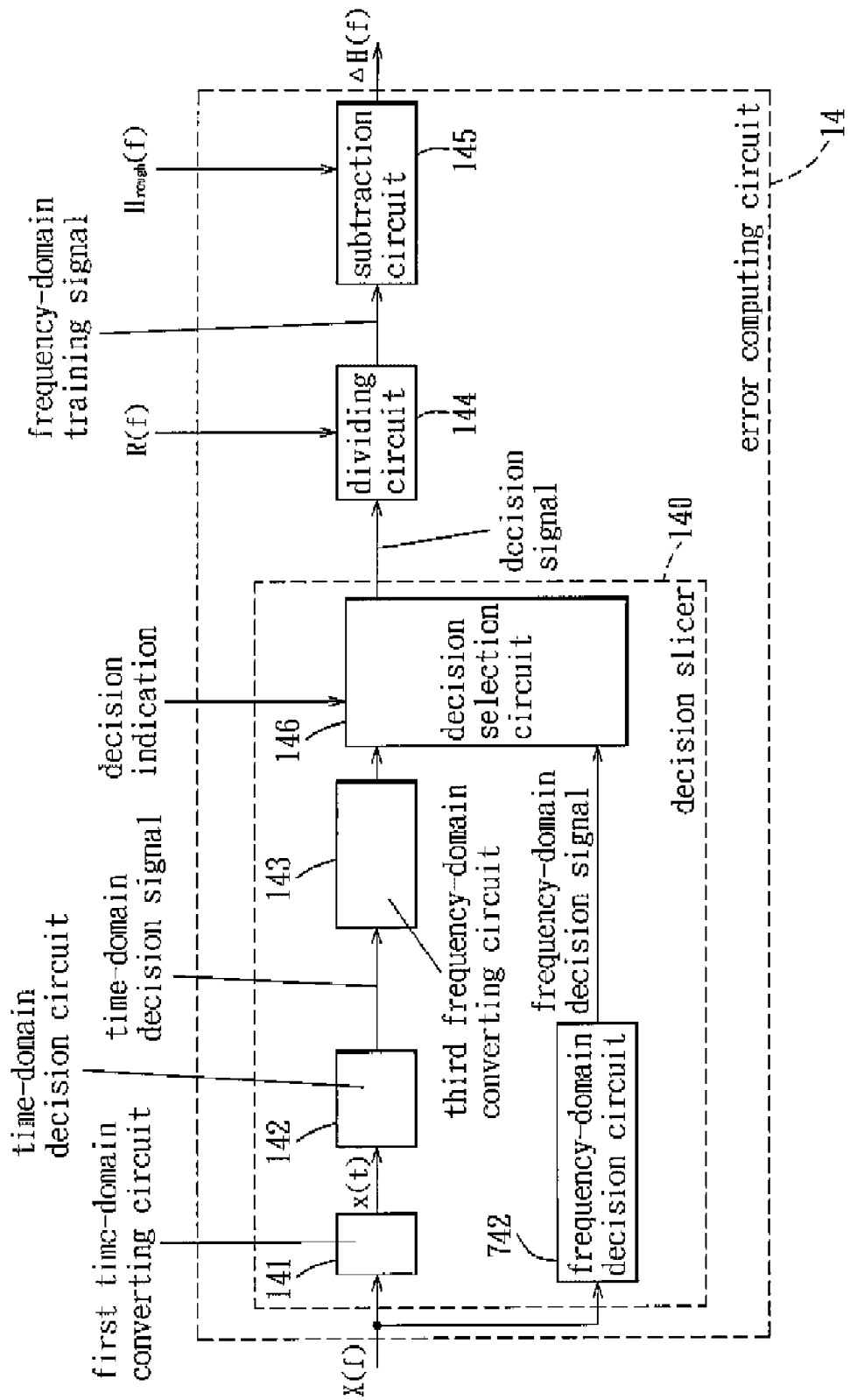
FIG. 2 is a block diagram of one form of an error computing circuit of the first preferred embodiment.

The error computing circuit 14 may have three different forms of implementation. Referring to FIG. 2, in the first form, the error computing circuit 14 uses a decision signal corresponding to the frequency-domain recovered signal X(f) to produce the corresponding frequency-domain error signals $\Delta H(f)$, and includes a decision slicer 140, a dividing circuit 144, and a subtraction circuit 145. The decision slicer 140 includes a time-domain decision circuit 142 (which is a slicer in this embodiment), a frequency-domain decision circuit 742 (which is a slicer in this embodiment), a first time-domain converting circuit 141, a third frequency-domain converting circuit 143, and a decision selection circuit 146.

Since the data to be transmitted is inserted into the time-domain received signal r(t) in either the time-domain or the frequency-domain at the transmitting end 81, the time-domain decision circuit 142 is caused to generate a time-domain decision signal in the time domain, and the frequency-domain decision circuit 742 is caused to generate a frequency-domain decision signal in the frequency domain. In order to perform slicing in the time domain, the time-domain decision circuit 142 slices only after conversion of the frequency-domain recovered signal X(f) into a time-domain recovered signal x(t) by the first time-domain converting circuit 141. Moreover, in order to match the frequency-domain decision signal outputted by the frequency-domain decision circuit 742, the third frequency-domain converting circuit 143 will perform frequency-domain conversion of the time-domain decision signal so as to allow the decision selection circuit 146 to select the conversion result from the third frequency-domain converting circuit 143 or the frequency-domain decision signal as the decision signal. Subsequently, the dividing circuit 144 divides the frequency-domain received signal R(f) by the decision signal so as to generate a frequency-domain training signal. The subtraction circuit 145 further subtracts the frequency-domain estimated signal $H_{rough}(f)$ from the frequency-domain training signal so as to generate the frequency-domain error signal $\Delta H(f)$. The selection by the decision selection circuit 146 is based on a decision indication indicating whether the data to be transmitted was inserted in the time domain or the frequency domain. If it is indicated that the data to be transmitted was inserted in the time domain, the conversion result from the third frequency-domain converting circuit 143 is selected. If it is indicated that the data to be transmitted was inserted in the frequency domain, the frequency-domain decision signal is selected.

An example is presented herein to illustrate the slicing by the time-domain decision circuit 142 and the frequency-domain decision circuit 742. Assuming the transmitting end 81 delivers the time-domain received signal r(t) after executing quadrature phase shift keying (QPSK) modulation, the modulated signal will correspond to a satellite graph having four modulated values, namely, (1, 1), (1, −1), (−1, 1), and (−1, −1). In the receiving device 100, the time-domain decision circuit 142 and the frequency-domain decision circuit 742 will select the modulated value which is nearest to the received signal as the slicing result based on a distance from the received signal to each of the four modulated values. Furthermore, with different methods of modulation, the number of modulated values in the satellite graph will vary, and the distances on which the slicing is based will be different accordingly. It should be noted that the aforementioned time-domain decision circuit 142 and frequency-domain decision circuit 742 are known in the art, and are therefore not described in detail herein, in addition, apart from the above-described implementation, a person having ordinary skill in the art may choose to employ other known or suitably modified slicing techniques to implement the time-domain decision circuit 142 and the frequency-domain decision circuit 742 according to the disclosure of this invention.

Figure 3:
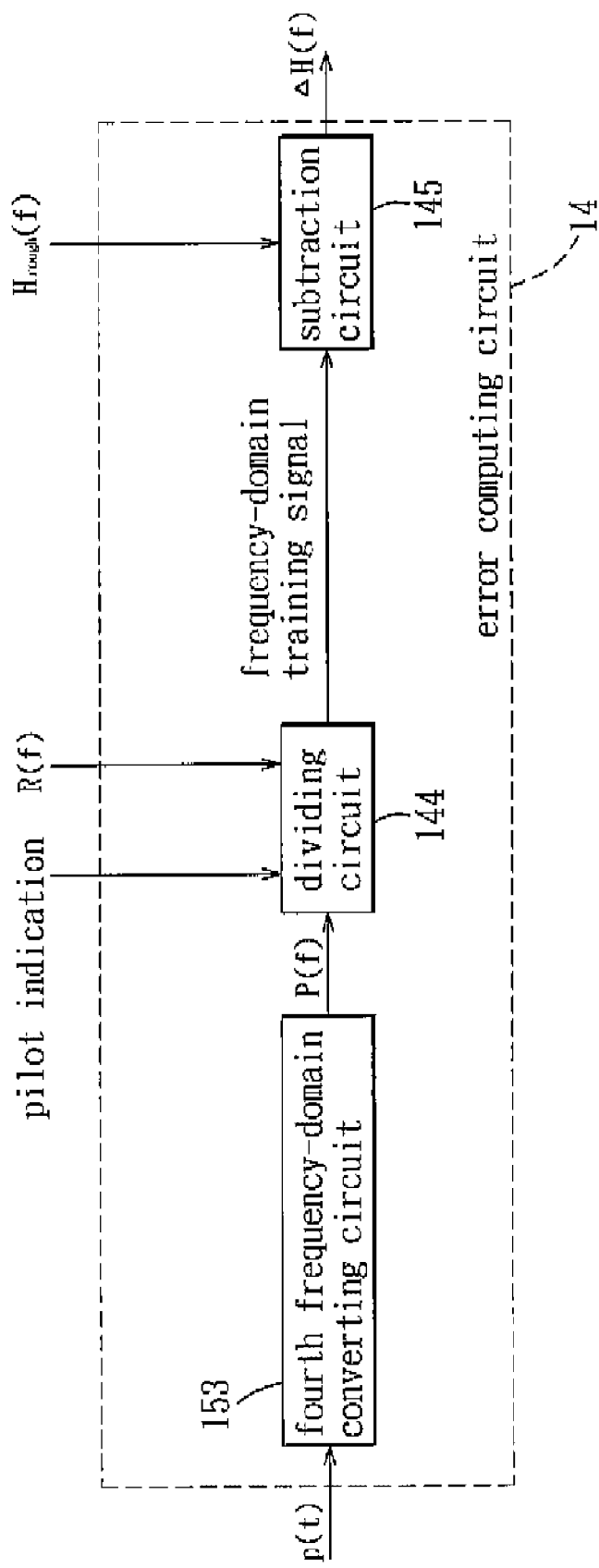
FIG. 3 is a block diagram of another form of an error computing circuit of the first preferred embodiment.

The second form of implementation of the error computing circuit 14 is shown in FIG. 3. In this form, the error computing circuit 14 is notified beforehand of the time-domain pilot signal p(t) inserted at the transmitting end 81, and utilizes the time-domain pilot signal p(t) to generate the frequency-domain error signal $\Delta H(f)$. The error computing circuit 14 includes a fourth frequency-domain converting circuit 153, a dividing circuit 144, and a subtraction circuit 145. The fourth frequency-domain converting circuit 153 first converts the time-domain pilot signal p(t) into a frequency-domain pilot signal P(f). At this stage, if the pilot indication outputted by the synchronization controller 4 is 1, the dividing circuit 144 divides the frequency-domain received signal R(f) by the frequency-domain pilot signal P(f) so as to generate the frequency-domain training signal. Thereafter, the subtraction circuit 145 subtracts the frequency-domain estimated signal $H_{rough}(f)$ from the frequency-domain training signal so as to generate the frequency-domain error signal $\Delta H(f)$. If the pilot indication outputted by the synchronization controller 4 is 0, the dividing circuit 144 and the subtraction circuit 145 will not perform any computation. Certainly, in another form of implementation, a determination may be made as to whether or not the frequency-domain error signal $\Delta H(f)$ is to be outputted according to the pilot indication after computation by the dividing circuit 144 and the subtraction circuit 145.

Figure 4:
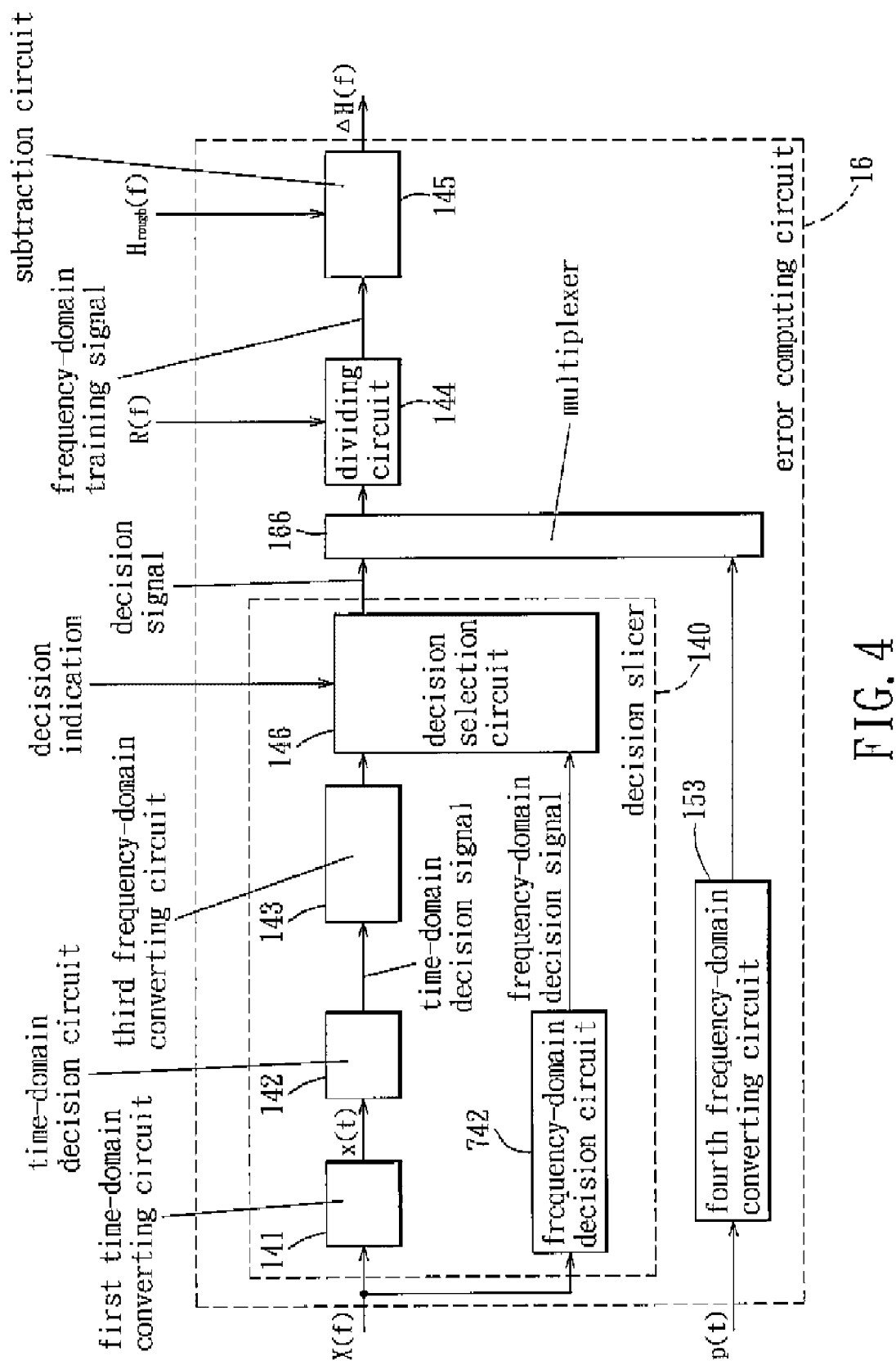
FIG. 4 is a block diagram of still another form of an error computing circuit of the first preferred embodiment.

The third form of implementation of the error computing circuit 16 is shown in FIG. 4. In this form, the error computing circuit 16 is notified beforehand of the time-domain pilot signal p(t), and generates the frequency-domain error signal $\Delta H(f)$ utilizing the frequency-domain pilot signal P(f) and a decision signal alternately.

In the third form of implementation, the error computing circuit 16 includes a multiplexer 166 for receiving the frequency-domain pilot signal P(f) and the decision signal. At the same time, the synchronization controller 4 also outputs a pilot indication. If the pilot indication is 1, the multiplexer 166 will select to output the frequency-domain pilot signal P(f) from the fourth frequency-domain converting circuit 153. If the pilot indication is 0, the multiplexer 166 will select to output the decision signal from the decision selection circuit 146 of the decision slicer 140. Thereafter, the output is provided to the dividing circuit 144 and the subtraction circuit 145 for computation. The operations executed by the dividing circuit 144 and the subtraction circuit 145 are similar to those in the second form of implementation of the error computing circuit 14.

In addition, since slicing errors may occur in the time-domain decision circuit 142 and the frequency-domain decision circuit 742, and since the frequency-domain received signal R(f) contains noise of the channel 82, the apparatus 1 further includes a low-pass filter 18 (as shown in FIG. 1) coupled between the error computing circuit 14 and the compensation circuit 13 to filter low frequency component from the frequency-domain error signal $\Delta H(f)$ outputted from the error computing circuit 14 so that the compensation circuit 13 can compensate the frequency-domain estimated signal $H_{rough}(f)$ based on the low frequency component of the frequency-domain error signal $\Delta H(f)$.

The reason for using the low frequency component of the frequency-domain error signal $\Delta H(f)$ for compensation in this embodiment is to allow the compensation circuit 13 to compensate the time-domain estimated signal $h_{rough}(t)$ outputted from the time-domain estimating circuit 11 so that the signal closely approximates the actual characteristics of the channel 82, thereby enhancing the accuracy of channel estimation and effectively recovering the signal transmitted from the transmitting end 81.

Figure 5:
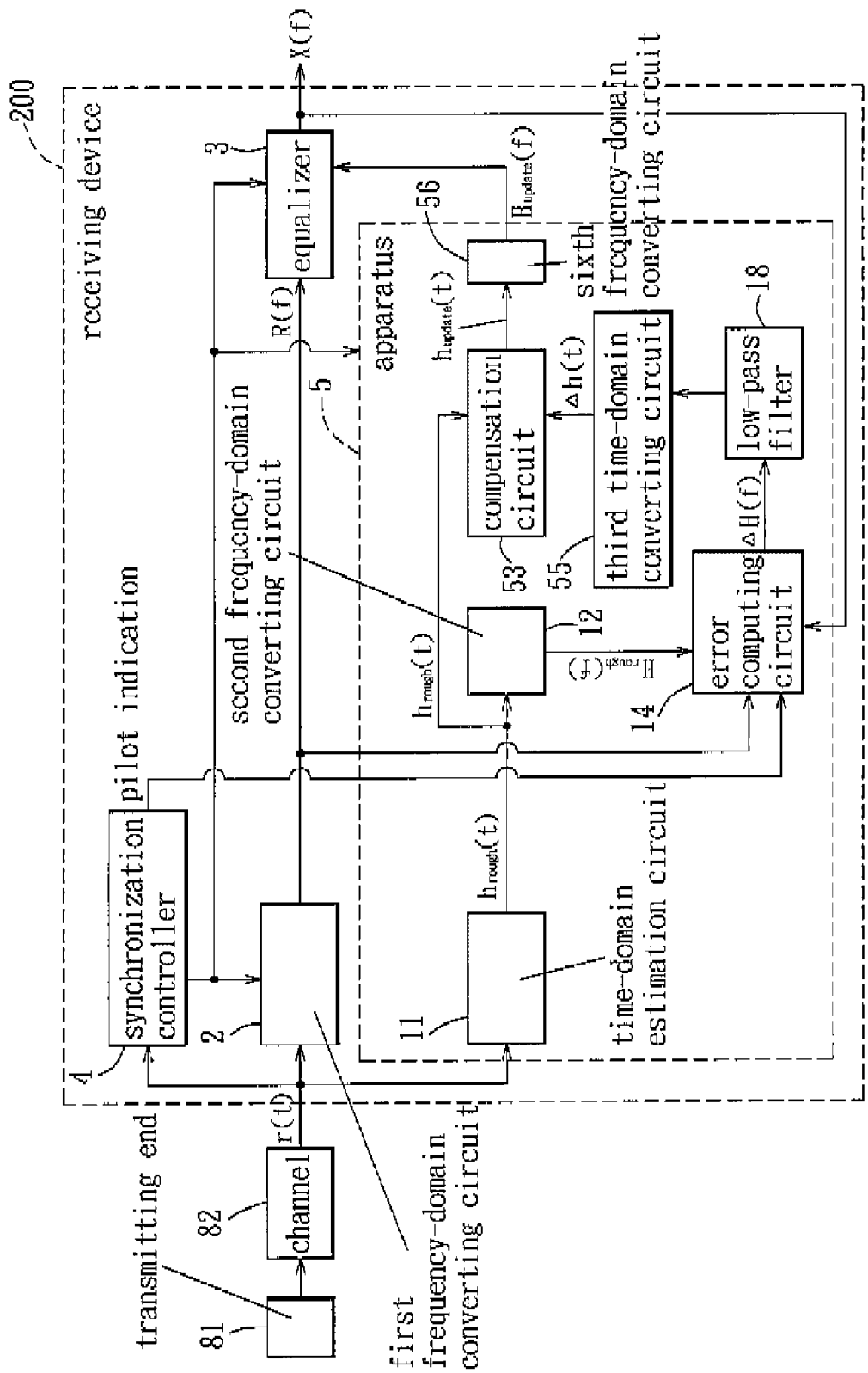
FIG. 5 is a block diagram illustrating the second preferred embodiment of a receiving device according to the present invention.

Referring to FIG. 5, the second preferred embodiment of a receiving device 200 according to the present invention is shown to include an apparatus 5 for performing channel estimation, a first frequency-domain converting circuit 2, an equalizer 3, and a synchronization controller 4. The apparatus 5 includes a time-domain estimating circuit 11, a second frequency-domain converting circuit 12, an error computing circuit 14, a compensation circuit 53, a third time-domain converting circuit 55, a low-pass filter 18, and a sixth frequency-domain converting circuit 56.

The second preferred embodiment differs from the first preferred embodiment in that the compensation circuit 53 performs processing in the time domain to produce a time-domain channel estimation signal $h_{update}(t)$. Therefore, the compensation circuit 53 receives a time-domain estimated signal $h_{rough}(t)$ from the time-domain estimating circuit 11, and further receives a time-domain error signal $\Delta h(t)$ from the third time-domain converting circuit 55. The third time-domain converting circuit 55 performs time-domain conversion after low frequency component has been filtered from the frequency-domain error signal $\Delta H(f)$ by the low-pass filter 18. After generation of the time-domain channel estimation signal $h_{update}(t)$ by the compensation circuit 53, the sixth frequency-domain converting circuit 56 converts the time-domain channel estimation signal $h_{update}(t)$ into a frequency-domain channel estimation signal $H_{update}(f)$, and sends the same to the equalizer 3.

Figure 6:
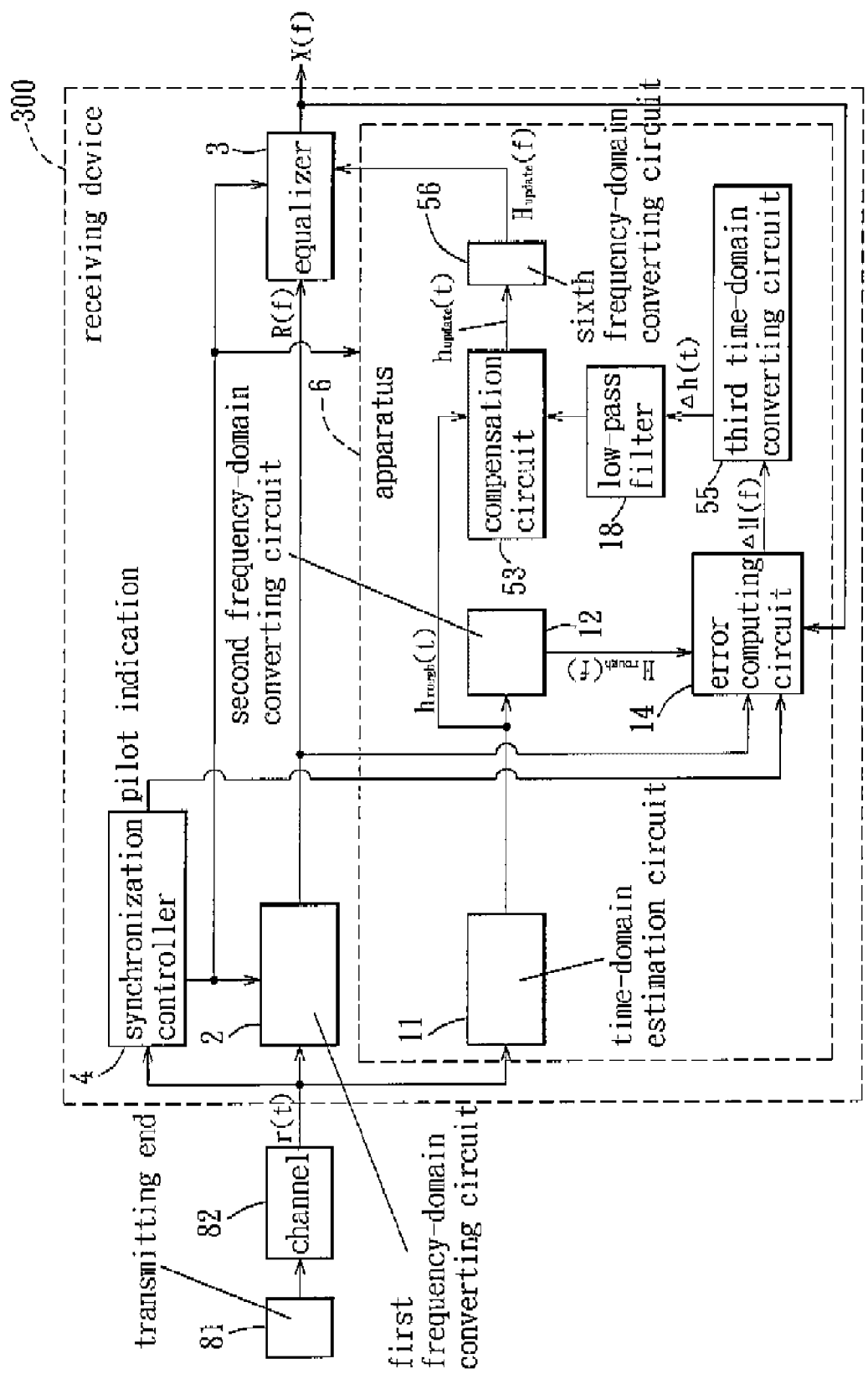
FIG. 6 is a block diagram of another realization of the second preferred embodiment.

In a modified embodiment, the receiving device 300 may change the order of execution for the low-pass filter 18 and the third time-domain converting circuit 55 of an apparatus 6 (as shown in FIG. 6) for performing channel estimation. In other words, the third time-domain converting circuit 55 first converts the frequency-domain error signal $\Delta H(f)$ into a time-domain error signal $\Delta h(t)$, and the low-pass filter 18 subsequently filters a low frequency component from the time-domain error signal $\Delta h(t)$ and outputs the low frequency component of the time-domain error signal $\Delta h(t)$ to the compensation circuit 53.

Figure 7:
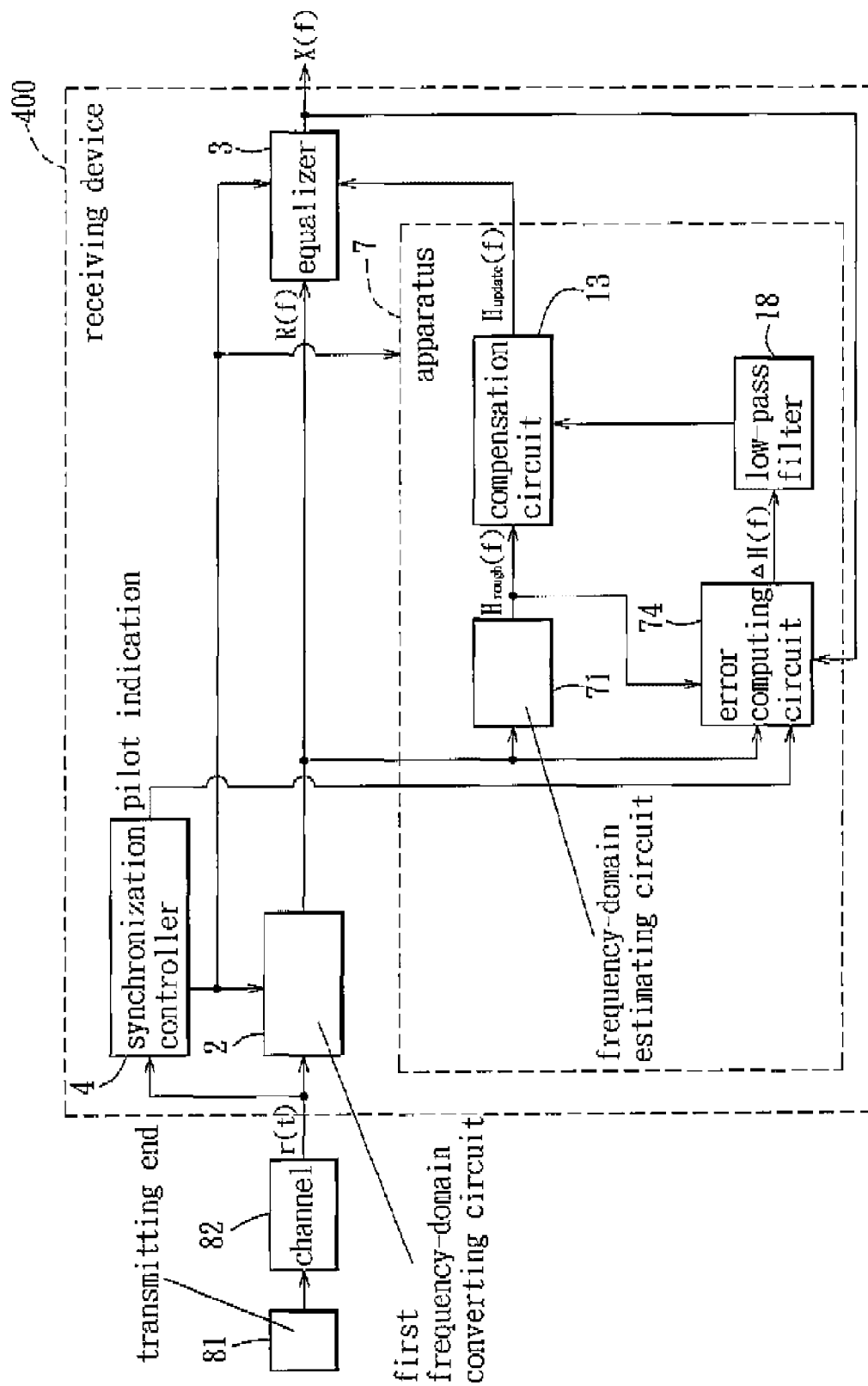
FIG. 7 is a block diagram illustrating the third preferred embodiment of a receiving device according to the present invention.

Referring to FIG. 7, the third preferred embodiment of a receiving device 400 according to the present invention is adapted for processing a time-domain received signal r(t) corresponding to a signal from a transmitting end 81 over a channel 82. The signal from the transmitting end 81 has at least one sub-band that carries data to be transmitted and a frequency-domain pilot signal P(f). The data to be transmitted and the frequency-domain pilot signal P(f) are inserted in the frequency domain at the transmitting end 81.

This preferred embodiment includes an apparatus 7 for performing channel estimation, a first frequency-domain converting circuit 2, an equalizer 3, and a synchronization controller 4. The first frequency-domain converting circuit 2 converts the time-domain received signal r(t) into a frequency-domain received signal R(f). In order to effectively identify the frequency-domain pilot signal P(f), the apparatus 7 particularly generates the frequency-domain channel estimation signal $H_{update}$(f) based on the frequency-domain received signal R(f), and the equalizer 3 subsequently generates the frequency-domain recovered signal X(f). Moreover, operation of all components of the receiving device 400 depends on the synchronization controller 4.

The apparatus 7 includes a frequency-domain estimating circuit 71, an error computing circuit 74, a compensation circuit 13, and a low-pass filter 18. The frequency-domain estimating circuit 71 performs channel estimation on the frequency-domain received signal R(f) in the frequency domain so as to output a frequency-domain estimated signal $H_{rough}$(f). One example of the frequency-domain estimating circuit 71 is a conventional frequency-domain channel estimator, such as a decision-directed frequency-domain channel estimator, or a pilot-symbol-aided frequency-domain channel estimator. Since such conventional channel estimators are known in the art, they will not be described in detail herein for the sake of brevity. The error computing circuit 74 generates a frequency-domain error signal ΔH(f) based on the frequency-domain estimated signal $H_{rough}$(f) and the frequency-domain received signal R(f), and the low-pass filter 18 filters low frequency component from the frequency-domain error signal ΔH(f) and outputs the low frequency component of the frequency-domain error signal ΔH(f) to the compensation circuit 13. The compensation circuit 13 then compensates the frequency-domain estimated signal $H_{rough}$(f) using the frequency-domain error signal ΔH(f) so as to produce the frequency-domain channel estimation signal $H_{update}$(f).

Figure 8:
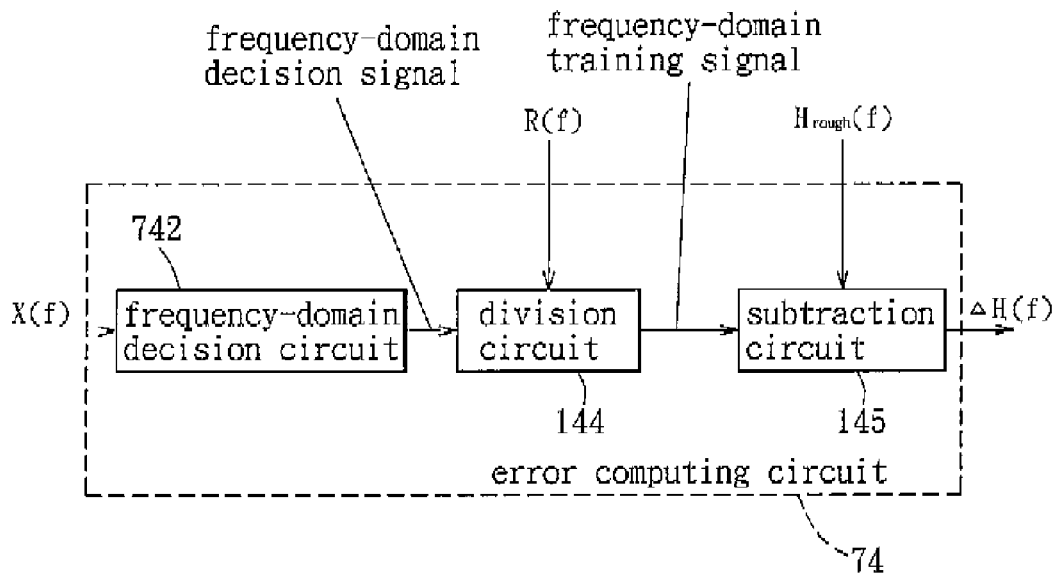
FIG. 8 is a block diagram of one form of an error computing circuit of the third preferred embodiment.

Since the data to be transmitted is inserted in the frequency domain at the transmitting end 81, the forms of implementation of the error computing circuit 74 in this preferred embodiment are different from those of the first preferred embodiment. Referring to FIG. 8, in the first form of implementation, the error computing circuit 74 includes a frequency-domain decision circuit 742, a dividing circuit 144, and a subtraction circuit 145. The frequency-domain decision circuit 742 slices the frequency-domain recovered signal X(f) to generate the frequency-domain decision signal. The dividing circuit 144 divides the frequency-domain received signal R(f) by the frequency-domain decision signal so as to generate a frequency-domain training signal. The subtraction circuit 145 then subtracts the frequency-domain estimated signal $H_{rough}$(f) from the frequency-domain training signal so as to produce the frequency-domain error signal ΔH(f).

Figure 9:
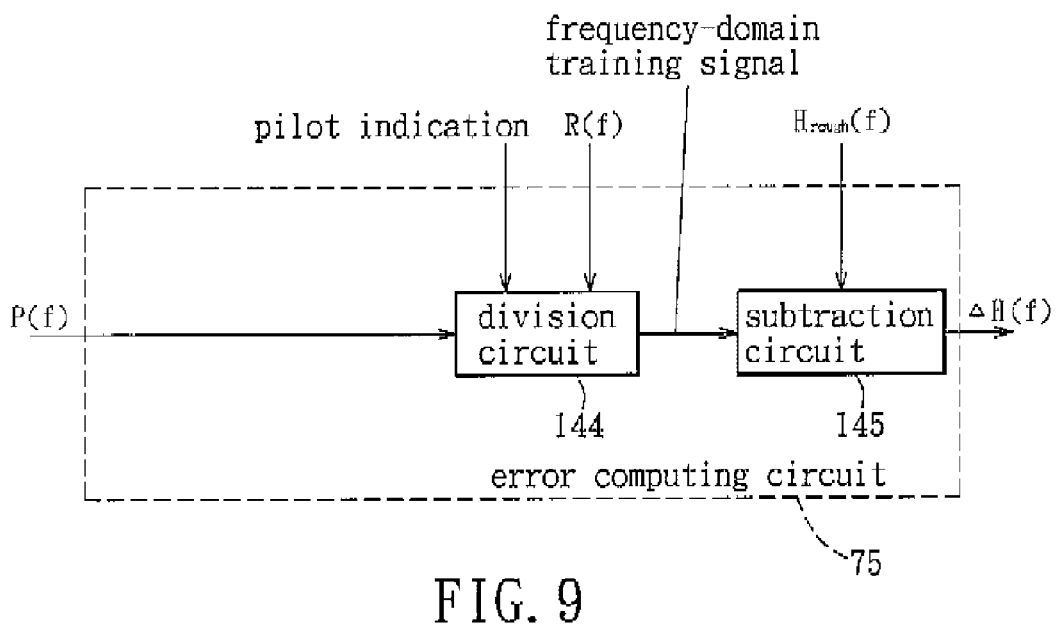
FIG. 9 is a block diagram of another form of an error computing circuit of the third preferred embodiment.

The second form of implementation of the error computing circuit 75 is shown in FIG. 9, and only includes a dividing circuit 144 and a sub tract ion circuit 145. Moreover, the synchronization controller 4 further outputs a pilot indication indicating a sub-band position where the frequency-domain pilot signal P(f) is located. The dividing circuit 144 divides the frequency-domain received signal R(f) by the frequency-domain pilot signal P(f) so as to generate a frequency-domain training signal when the pilot indication indicates that a specific sub-band is carrying the frequency-domain pilot signal P(f). The subtraction circuit 145 subsequently subtracts the frequency-domain estimated signal $H_{rough}$(f) from the frequency-domain training signal so as to produce the frequency-domain error signal ΔH(f). Certainly, in another implementation, the frequency-domain error signal ΔH(f) is outputted according to the pilot indication after computation by the dividing circuit 144 and the subtraction circuit 145.

Figure 10:
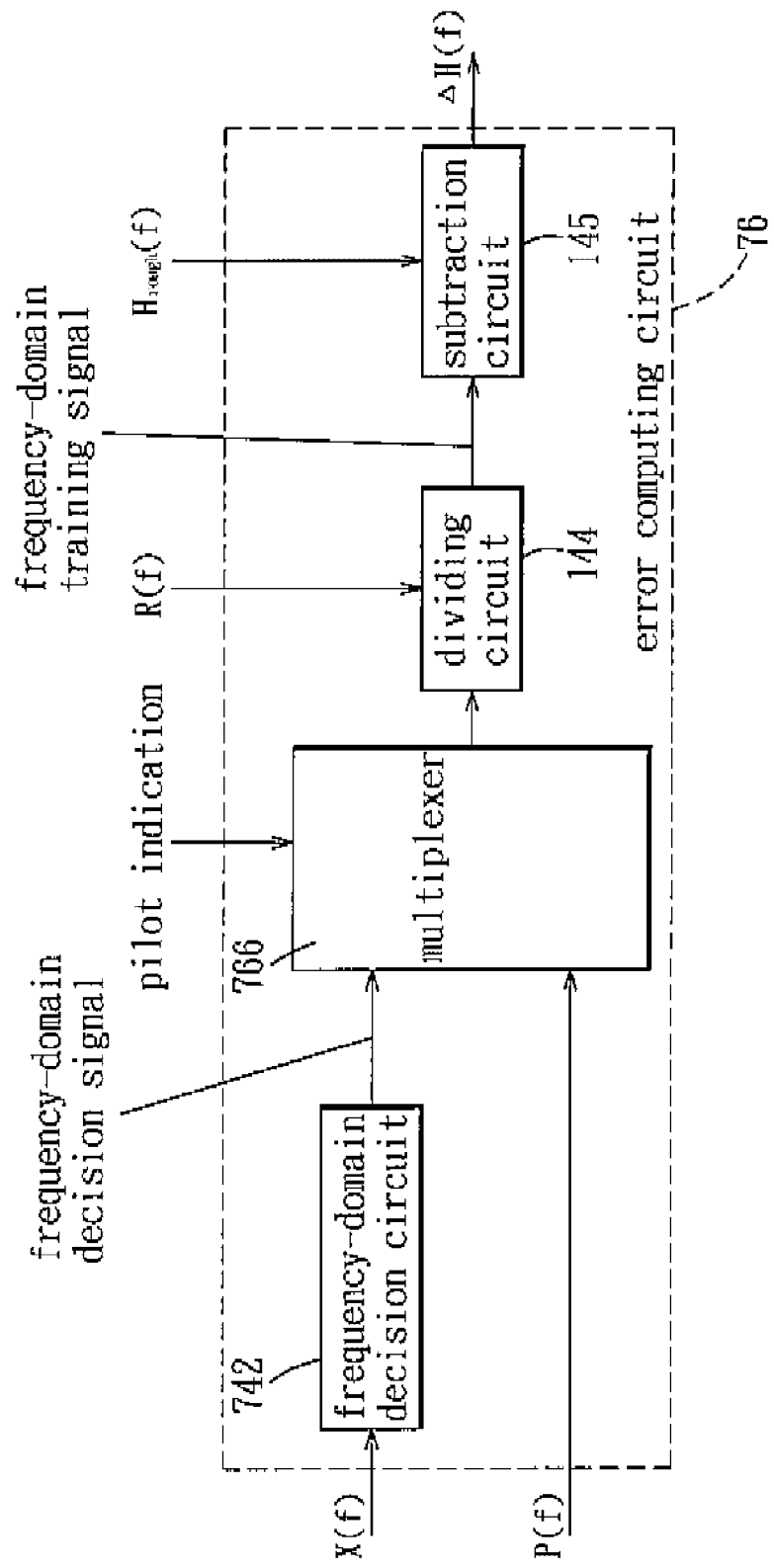
FIG. 10 is a block diagram of still another form of an error computing circuit of the third preferred embodiment.

Compared to the first form of implementation, the third form of implementation of the error computing circuit 76 shown in FIG. 10 further includes a multiplexer 766, end the synchronization controller 4 also outputs the pilot indication. The multiplexer 766 selects to transmit one of the frequency-domain decision signal and the frequency-domain pilot signal P(f) to the dividing circuit 144 based on the pilot indication. Lastly, the frequency-domain error signal ΔH(f) is accordingly produced using the dividing circuit 144 and the subtraction circuit 145.

Certainly, if the time-domain received signal r(t) does not carry any pilot signal p(t), the first form of implementation of the error computing circuit 14 according to the first preferred embodiment as shown in FIG. 2 may be employed to produce the frequency-domain error signal ΔH(f).

In the above-described embodiments, the first to fourth frequency-domain converting circuits 2, 12, 143, 153 as well as the sixth frequency-domain converting circuit 56 are fast Fourier transformers (FFT), and the first and third time-domain converting circuits 141, 55 are inverse fast Fourier transformers (IFFT). It is worth noting that the apparatus 1, 5~7 in the above preferred embodiments may be independent of the receiving device 100~400.

In sum, in the apparatus for performing channel estimation and the receiving device according to the invention, through use of the error computing circuit 14~16, 74~76 to produce the frequency-domain error signal ΔH(f) based on the frequency-domain recovered signal X(f), and the frequency-domain pilot signal P(f) or the time-domain pilot signal p(t) for compensating the output from the time-domain estimating circuit 11 or the frequency-domain estimating circuit 71, the accuracy of channel estimation can be enhanced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An apparatus for performing channel estimation on a time-domain received signal through a channel, and a frequency-domain received signal corresponding to the time-domain received signal, the apparatus comprising:

a time-domain estimating circuit to perform a channel estimation on the time-domain received signal in the time domain to output a time-domain estimated signal representing an estimation of a characteristic of the channel;

a first frequency-domain converting circuit to convert the time-domain estimated signal into a frequency-domain estimated signal;

an error computing circuit to produce an error signal based on the frequency-domain estimated signal and the frequency-domain received signal; and a compensation circuit to compensate the frequency-domain estimated signal in the frequency domain using the error signal so as to produce a final channel estimation signal representative of the characteristic of the channel;

wherein the error computing circuit comprises:

a decision slicer to produce a decision signal based on a frequency-domain recovered signal generated from the frequency-domain received signal and the final channel estimation signal;

a dividing circuit to generate a frequency-domain training signal based on the frequency-domain received signal and the decision signal; and a subtraction circuit to generate the error signal according to the frequency-domain estimated signal and the frequency-domain training signal.

2. The apparatus of claim 1, which is located in a receiving device, the receiving device comprises:
a second frequency-domain converting circuit to convert the time-domain received signal into the frequency-domain received signal; and
an equalizer to generate a frequency-domain recovered signal corresponding to the time-domain received signal based on the frequency-domain received signal and the final channel estimation signal.

3. The apparatus of claim 2, wherein the decision slicer comprises:
a frequency-domain decision circuit to slice the frequency-domain recovered signal to generate a first frequency-domain decision signal;
a first time-domain converting circuit to convert the frequency-domain recovered signal into a time-domain recovered signal;
a time-domain decision circuit to slice the time-domain recovered signal to generate a time-domain decision signal;
a third frequency-domain converting circuit to convert the time-domain decision signal into a second frequency-domain decision signal; and
a decision selection circuit for selecting one of the first frequency-domain decision signal and the second frequency-domain decision signal to be the decision signal based on a decision indication.

4. The apparatus of claim 3, wherein the error computing circuit comprises:
a fourth frequency-domain converting circuit to convert a time-domain pilot signal of the time-domain received signal into a frequency-domain pilot signal; and
a multiplexer to select one of the frequency-domain pilot signal and the decision signal based on a pilot indication.

5. An apparatus for performing channel estimation on a time-domain received signal through a channel, and a frequency-domain received signal corresponding to the time-domain received signal, the apparatus comprising:
a time-domain estimating circuit to perform a channel estimation on the time-domain received signal in the time domain to output a time-domain estimated signal representing an estimation of a characteristic of the channel;
a first frequency-domain converting circuit to convert the time-domain estimated signal into a frequency-domain estimated signal;
an error computing circuit to produce an error signal based on the frequency-domain estimated signal and the frequency-domain received signal; and
a compensation circuit to compensate the frequency-domain estimated signal in the frequency domain using the error signal so as to produce a final channel estimation signal representative of the characteristic of the channel;
wherein the error computing circuit comprises:
a second frequency-domain converting circuit to convert a time-domain pilot signal of the time-domain received signal into a frequency-domain pilot signal;
a dividing circuit to generate a frequency-domain training signal according to the frequency-domain received signal and the frequency-domain pilot signal; and
a subtraction circuit to generate the error signal according to the frequency-domain estimated signal and the frequency-domain training signal.

6. The apparatus of claim 1, further comprising a low-pass filter coupled between the error computing circuit and the compensation circuit.

7. An apparatus for performing channel estimation on a time-domain received signal through a channel, and a frequency-domain received signal corresponding to the time-domain received signal, the apparatus comprising:
a time-domain estimating circuit to perform a channel estimation on the time-domain received signal in the time domain to output a time-domain estimated signal representing an estimation of a characteristic of the channel;
a first frequency-domain converting circuit to convert the time-domain estimated signal into a frequency-domain estimated signal;
an error computing circuit to produce a frequency-domain error signal based on the frequency-domain estimated signal and the frequency-domain received signal;
a first time-domain converting circuit to convert the frequency-domain error signal into a time-domain error signal;
a compensation circuit to compensate the time-domain estimated signal in the time domain using the time-domain error signal so as to produce a time-domain channel estimation signal representative of the characteristic of the channel; and
a second frequency-domain converting circuit to convert the time-domain channel estimation signal to a final channel estimation signal, wherein each of the circuits operates according to a reference signal generated by a synchronization controller based on the time-domain received signal.

8. The apparatus of claim 7, which is located in a receiving device comprising:
a second frequency-domain converting circuit to convert the time-domain received signal to the frequency-domain received signal; and
an equalizer to generate a frequency-domain recovered signal corresponding to the time-domain received signal based on the frequency-domain received signal and the final channel estimation signal.

9. The apparatus of claim 7, further comprising a low-pass filter coupled between the error computing circuit and the compensation circuit.

10. An apparatus for performing channel estimation on a frequency-domain received signal over a channel, the apparatus comprising:
a frequency-domain estimating circuit to perform a channel estimation on the frequency-domain received signal in the frequency domain to output a frequency-domain estimated signal representing an estimation of a characteristic of the channel;
an error computing circuit to produce an frequency-domain error signal based on the frequency-domain estimated signal and the frequency-domain received signal; and
a compensation circuit to compensate the frequency-domain estimated signal using the frequency-domain error signal so as to produce a final channel estimation signal representative of the characteristic of the channel;
wherein the error computing circuit comprises:
a frequency-domain decision circuit to generate a frequency-domain decision signal based on a frequency-domain recovered signal generated from the frequency-domain received signal and the final channel estimation signal;

a dividing circuit to generate a frequency-domain training signal according to the frequency-domain received signal and the frequency-domain decision signal; and a subtraction circuit to generate the frequency-domain error signal according to the frequency-domain estimated signal and the frequency-domain training signal.

11. The apparatus of claim 10, which is located in a receiving device, the receiving device further comprises:

a first frequency-domain converting circuit to convert the time-domain received signal into the frequency-domain received signal; and an equalizer to generate a frequency-domain recovered signal corresponding to the time-domain received signal based on the frequency-domain received signal and the final channel estimation signal.

12. The apparatus of claim 11, the error computing circuit further comprising a multiplexer to select one of the frequency-domain pilot signal and the frequency-domain decision signal based on a pilot indication.

13. The apparatus of claim 10, the error computing circuit comprising:

a dividing circuit to generate a frequency-domain training signal according to the frequency-domain received signal and a frequency-domain pilot signal, wherein the frequency-domain received signal comprises at least one sub-band that carries the frequency-domain pilot signal; and a subtraction circuit to generate the frequency-domain error signal according to the frequency-domain estimated signal and the frequency-domain training signal.

14. The apparatus of claim 10, further comprising a low-pass filter coupled between the error computing circuit and the compensation circuit.

* * * * *